United States Patent
Zwerg et al.

(10) Patent No.: US 11,132,050 B2
(45) Date of Patent: *Sep. 28, 2021

(54) COMPUTE THROUGH POWER LOSS HARDWARE APPROACH FOR PROCESSING DEVICE HAVING NONVOLATILE LOGIC MEMORY

(71) Applicant: TEXAS INSTRUMENTS INCORPORATED, Dallas, TX (US)

(72) Inventors: Michael Zwerg, Dallas, TX (US); Steven Craig Bartling, Plano, TX (US); Sudhanshu Khanna, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/451,260

(22) Filed: Jun. 25, 2019

(65) Prior Publication Data

US 2019/0377404 A1   Dec. 12, 2019

Related U.S. Application Data

(63) Continuation of application No. 15/016,449, filed on Feb. 5, 2016, now Pat. No. 10,331,203.

(Continued)

(51) Int. Cl.
*G06F 1/3293*   (2019.01)
*G06F 3/06*    (2006.01)
(Continued)

(52) U.S. Cl.
CPC .......... *G06F 1/3293* (2013.01); *G06F 1/3206* (2013.01); *G06F 1/3287* (2013.01);
(Continued)

(58) Field of Classification Search
CPC .......... G05B 2219/13002; G05B 2219/14053; G05B 2219/14141; G05B 2219/25289;
(Continued)

(56) References Cited

U.S. PATENT DOCUMENTS

| | | | |
|---|---|---|---|
| 6,081,752 A | 6/2000 | Benson | |
| 6,226,556 B1 | 5/2001 | Itkin | |

(Continued)

FOREIGN PATENT DOCUMENTS

| | | |
|---|---|---|
| CN | 101458668 A | 6/2009 |
| CN | 102789134 A | 11/2012 |
| CN | 102929805 A | 2/2013 |

OTHER PUBLICATIONS

Wang, Y., et al.; "A 3us Wake-up Time Nonvolatile Processor Based on Ferroelectric Flip-Flops"; IEEE 2012, 4 pages.

(Continued)

*Primary Examiner* — Jaweed A Abbaszadeh
*Assistant Examiner* — Brian J Corcoran
(74) *Attorney, Agent, or Firm* — Charles F. Koch; Charles A. Brill; Frank D. Cimino

(57) ABSTRACT

A computing device apparatus facilitates use of a deep low power mode that includes powering off the device's CPU by including a hardware implemented process to trigger storage of data from the device's volatile storage elements in non-volatile memory in response to entering the low power mode. A hardware based power management unit controls the process including interrupting a normal processing order of the CPU and triggering the storage of the data in the non-volatile memory. In response to a wake-up event, the device is triggered to restore the data stored in the non-volatile memory to the volatile memory prior to execution of a wake up process for the CPU from the low power mode. The device includes a power storage element such as a (Continued)

capacitor that holds sufficient energy to complete the nonvolatile data storage task prior to entering the low power mode.

15 Claims, 6 Drawing Sheets

Related U.S. Application Data

(60) Provisional application No. 62/272,473, filed on Dec. 29, 2015.

(51) Int. Cl.
    *G06F 1/3206*         (2019.01)
    *G06F 1/3287*         (2019.01)
    *G06F 11/07*          (2006.01)

(52) U.S. Cl.
    CPC ............ *G06F 3/061* (2013.01); *G06F 3/0625* (2013.01); *G06F 3/0634* (2013.01); *G06F 3/0655* (2013.01); *G06F 3/0656* (2013.01); *G06F 3/0688* (2013.01); *G06F 11/07* (2013.01); *Y02D 10/00* (2018.01); *Y02D 30/50* (2020.08)

(58) Field of Classification Search
    CPC . G06F 1/30; G06F 1/32; G06F 1/3203; G06F 1/3206; G06F 1/3212; G06F 1/3234; G06F 1/3246; G06F 1/3268; G06F 1/3275; G06F 11/1441; G06F 11/2015; G06F 12/00; G06F 12/0238; G06F 12/0246; G06F 12/0868; G06F 13/1694; G06F 2212/214; G06F 3/0679; G06F 9/4418; G06F 9/44505; H04N 1/00893; H04N 1/00896; Y02B 60/1246; Y02B 60/1292; Y02B 60/186
See application file for complete search history.

(56) References Cited

U.S. PATENT DOCUMENTS

| | | | |
|---|---|---|---|
| 6,711,692 B1 | 3/2004 | Maeda | |
| 6,901,298 B1 | 5/2005 | Govindaraj | |
| 7,225,353 B1* | 5/2007 | Wong | G06F 1/30 |
| | | | 713/300 |
| 7,639,056 B2 | 12/2009 | Gururajarao | |
| 8,056,088 B1 | 11/2011 | Dharmapurikar | |
| 8,892,789 B2 | 11/2014 | Spry | |
| 9,092,206 B2 | 7/2015 | Rzehak | |
| 9,432,298 B1 | 8/2016 | Smith | |
| 9,698,770 B1 | 7/2017 | Menezes | |
| 9,831,696 B2* | 11/2017 | Iida | G06F 1/3243 |
| 2004/0073818 A1 | 4/2004 | Cheok | |
| 2004/0085846 A1 | 5/2004 | Yokozeki | |
| 2005/0141260 A1 | 6/2005 | Suzuki | |
| 2006/0015683 A1 | 1/2006 | Ashmore | |
| 2006/0072369 A1 | 4/2006 | Madter | |
| 2006/0080515 A1 | 4/2006 | Spiers | |
| 2006/0242398 A1 | 10/2006 | Fontijn | |
| 2006/0279977 A1 | 12/2006 | Shiga | |
| 2007/0067435 A1 | 3/2007 | Landis et al. | |
| 2007/0083743 A1 | 4/2007 | Tsang | |
| 2007/0136523 A1 | 6/2007 | Bonella | |
| 2007/0217404 A1 | 9/2007 | Kawamata | |
| 2008/0155242 A1 | 6/2008 | Beelitz | |
| 2008/0235443 A1 | 9/2008 | Chow et al. | |
| 2008/0235471 A1 | 9/2008 | Feldman | |
| 2008/0265962 A1 | 10/2008 | Waldrip | |
| 2008/0320214 A1 | 12/2008 | Ma et al. | |
| 2009/0267570 A1 | 10/2009 | Paunonen | |
| 2009/0292937 A1 | 11/2009 | Bakker | |
| 2010/0006378 A1 | 1/2010 | Blasko | |
| 2011/0119506 A1 | 5/2011 | Tsai | |
| 2011/0197018 A1 | 8/2011 | Noh | |
| 2011/0202794 A1 | 8/2011 | Kim | |
| 2011/0231685 A1 | 9/2011 | Huang et al. | |
| 2012/0036346 A1 | 2/2012 | Bower | |
| 2012/0042206 A1 | 2/2012 | Di Dominico | |
| 2012/0137075 A1 | 5/2012 | Vorbach | |
| 2012/0317143 A1 | 12/2012 | Fuchikami | |
| 2013/0031388 A1 | 1/2013 | Sakarda | |
| 2013/0042052 A1 | 2/2013 | Colgrove | |
| 2013/0060993 A1 | 3/2013 | Park et al. | |
| 2013/0326206 A1 | 12/2013 | Lueck et al. | |
| 2014/0006887 A1 | 1/2014 | Greene | |
| 2014/0047247 A1 | 2/2014 | Rzehak | |
| 2014/0075088 A1 | 3/2014 | Bartling | |
| 2014/0075089 A1 | 3/2014 | Bartling et al. | |
| 2014/0075174 A1 | 3/2014 | Bartling | |
| 2014/0075232 A1 | 3/2014 | Bartling | |
| 2014/0086266 A1 | 3/2014 | Strait et al. | |
| 2014/0153325 A1 | 6/2014 | Wang | |
| 2014/0208004 A1 | 7/2014 | Cohen | |
| 2014/0337560 A1 | 11/2014 | Chun et al. | |
| 2015/0106560 A1 | 4/2015 | Perego et al. | |
| 2015/0189608 A1 | 7/2015 | Strait et al. | |
| 2015/0323983 A1 | 11/2015 | Hobson | |
| 2016/0246355 A1 | 8/2016 | Dannenberg et al. | |
| 2016/0266641 A1 | 9/2016 | Rogers et al. | |
| 2016/0344629 A1 | 11/2016 | Gray | |
| 2017/0109054 A1 | 4/2017 | Waechter | |
| 2017/0185139 A1 | 6/2017 | Zwerg et al. | |
| 2018/0136843 A1 | 3/2018 | Lee et al. | |
| 2018/0136851 A1 | 5/2018 | Batra et al. | |
| 2020/0067768 A1 | 2/2020 | Dome et al. | |

OTHER PUBLICATIONS

Masui, S., et al., "Design and Applications of Ferroelectric Nonvolatile SRAM and Flip-Flop with Unlimited Read/Program Cycles and Stable Recall"; IEEE 2003 Custom Integrated Circuits conference; 2003, 4 pages.

Udayakumar, K.R., et al.; "Manufacturable High-Density 8 Mbit One Transistor-One Capacitor Embedded Ferroelectric Random Access Memory"; Japanese Journal of Applied Physics; vol. 47, No. 4, 2008; 4 pages.

Moise, T.S., et al.; "Electrical Properties of Submicron (>0.13 um2) Ir/PZT/Ir Capacitors Formed on W plugs"; IEEE 1999; 3 pages.

Moise, T.S. et al.; "Demonstration of a 4Mb, High Density Ferroelectric Memory embedded with a 130nm, 5LM Cu/FSG Logic Process"; IEEE 2002; 4 pages.

Wang, Y., et al.; "A Compression-based Area-efficient Recovery Architecture for Nonvolatile Processors"; EDAA 2012, dated Mar. 12-16, 2012, Dresden, Germany; 6 pages.

Yu, W., et al.; "A Non-Volatile Microcontroller with Integrated Floating-Gate Transistors"; IEEE 2011; 6 pages.

TMS9900 Datasheet, programmable system interface; Texas Instruments, retrieved from web at http://www.alldatasheet.com/datasheet-pdf/pdf/29082/TI/TMS9900.html (14 pages).

* cited by examiner

COMPUTE THROUGH POWER LOSS HARDWARE APPROACH FOR PROCESSING DEVICE HAVING NONVOLATILE LOGIC MEMORY

RELATED APPLICATION(S)

This application is a continuation of and claims priority to U.S. patent application Ser. No. 15/016,449 filed on Feb. 5, 2016, now U.S. Pat. No. 10,331,203, which claims priority to U.S. Provisional Patent Application No. 62/272,473, filed Dec. 29, 2015, each of which are incorporated herein by reference in its entirety.

TECHNICAL FIELD

This invention generally relates to processing devices having nonvolatile memory and, in particular, to power loss operations for such processing devices.

BACKGROUND

Electronic devices are continually facing performance pressures including providing increased computing power and providing varied control capabilities. The performance pressures also include needing ever increasing abilities to extend battery life or generally improve power efficiency of a computing device's operation. Accordingly, computing devices of various types include varying ways of enter low power modes that allow the given device to use less power. Low power modes generally include stopping use of various features or powering down certain peripherals for the device.

The lowest of the low power modes include actually removing power from a device's central processing unit ("CPU"). Entering into the lowest power modes, however, typically results in such devices not retaining the CPU's state. Therefore, the device must be reset upon wakeup to restore an operating state of the CPU and associated peripherals. A programmer of applications running on such a device is forced to handle this reset condition and manually restore the application's state to where it was before the device entered into deep low power mode, i.e., power down of the CPU. This is especially true as more complex software is used in embedded systems, such software including graphical display applications, radio frequency communications having complex protocol stacks, or real time operating systems. Such applications can require several thousand CPU cycles on device startup to initialize software variables before an intended task begins. In one example, running a C-Init and User-Init processes (initialization processes for the CPU and the user application, respectively) can require up to 101 milliseconds and 298 microseconds, respectively. In addition to the time delay, the rebooting process places a further drain on applicable battery resources as well. This is a painful process for customers using such computing or processing devices subject to interruptible power sources and/or using deep low power modes.

SUMMARY

Generally speaking, pursuant to these various embodiments, a computing device apparatus facilitates use of a low power mode that includes powering off the device's CPU by including a hardware implemented process to trigger storage of data from the device's volatile storage elements such as various state information in non-volatile memory in response to entering the low power mode. A hardware based power management unit is configured to control the process including interrupting a normal processing order of the CPU and triggering the storage of the data in the non-volatile memory. In response to a wake-up event, the device is triggered to restore the data stored in the non-volatile memory to the volatile memory prior to execution of a wake up process for the CPU from the low power mode. The device includes a power storage element such as a capacitor that holds sufficient energy to complete the non-volatile data storage task prior to entering the low power mode. Optionally, the device's power management unit is configured to prevent device startup unless enough energy is present on the energy storage unit to complete a round trip restore and save operation.

So configured, the device need not execute a full reset of the CPU during the wake up from a deep low power mode. Instead, the CPU's and associated peripheral's stable operating state parameters are readily available and restorable from the non-volatile storage, which is able to store such information without consuming power. Also, the hardware implementation can be configured to trigger the storage process at a level of applied power sufficient to guarantee availability of enough power (even in a total power loss event) of storage of the CPU's and/or associated peripheral's state. Also, state information known to be corruptible during sudden power down events can be selectively ignored and not stored during the state storage process thereby allowing for only a limited wake up process, which is quicker and less power consuming that a full wake up routine for the CPU. These and other benefits will become apparent through study of the following description and drawings.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Figure 1:
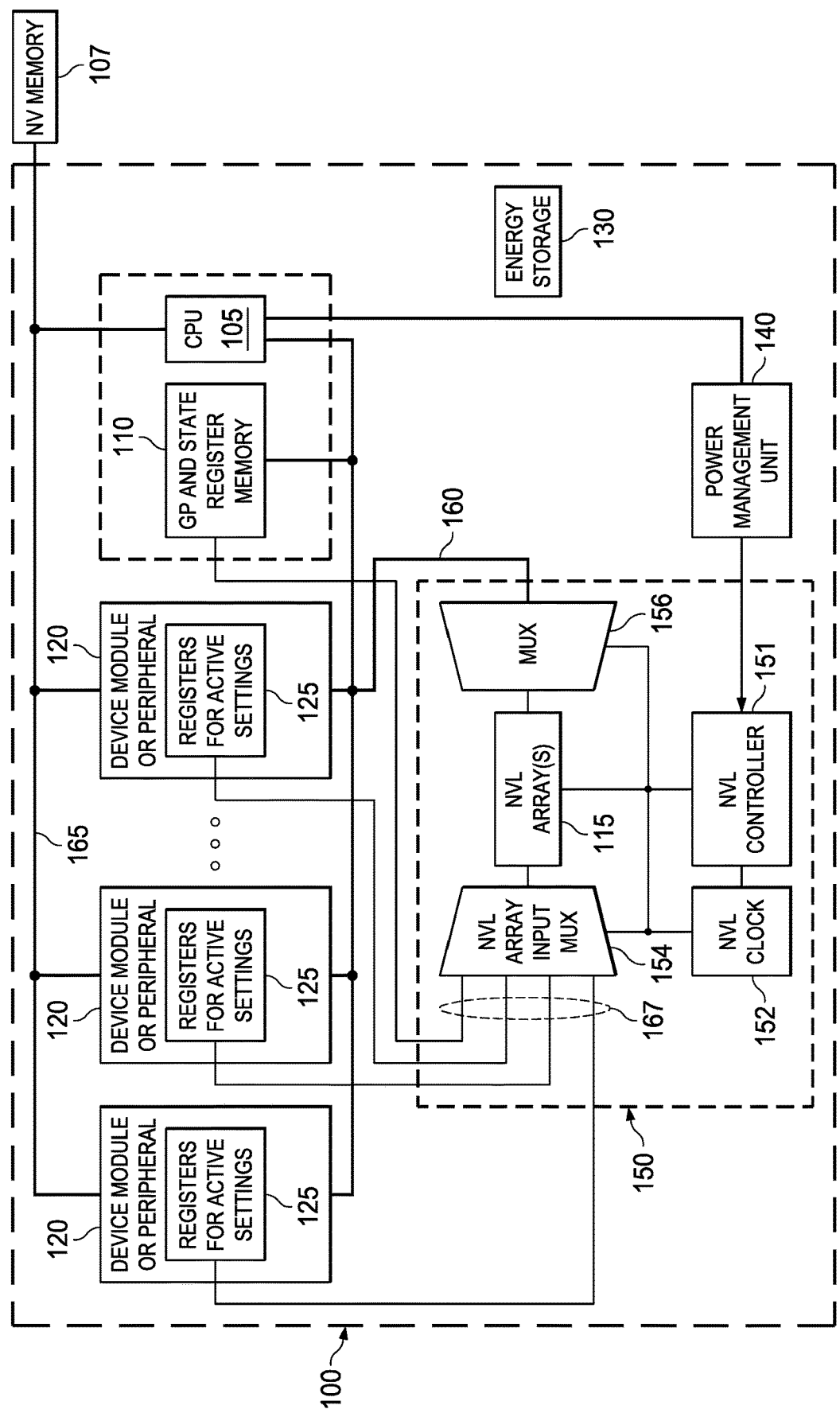
FIG. 1 is a block diagram of an example computing device as configured in accordance with various embodiments of the invention.

Turning now to the figures, especially FIG. 1, an example computing device apparatus 100 that is compatible with many of these teachings will now be described. The computing device 100 includes a central processing unit ("CPU") 105, a first non-volatile memory 107, a volatile general purpose and state register memory 110, a second non-volatile memory 115, and a number of peripherals or device modules 120. The first non-volatile memory 107 is connected to store software related information such as program and variable data. The memory 110 and configuration registers 125 are volatile storage elements configured to store configuration profile data for currently active settings of the computing device 100 or peripherals 120 associated with the computing device 100. The memory 110 storing data for the CPU 105 may be embedded within the CPU 105, or it may be separate from and associated with the CPU 105. An energy storage unit 130 is connected to provide power to the computing device apparatus 100. Typically, the energy storage unit 130 is a capacitor although other suitable devices can be used. A power management unit 140 is configured to detect multiple levels of available power for the CPU 105 and to effect switching power on or off for the CPU 105. Each of these elements is individually known in the art such that no further description is necessary.

The second non-volatile memory 115 is configured to store hardware (logic) state information. This memory 115 is part of a non-volatile sub-system 150, which includes a non-volatile controller 151 configured to control the non-volatile memory 115 and have direct access to volatile storage elements 110, 125 embedded in or associated with one or more of the central processing unit or one or more peripherals. The NVL memory 115 itself may be a flash-type memory, a ferro-magnetic random access memory ("FRAM") based state retention technology that combines characteristics of FRAM memory with current data retention methods, or other technologies with similar features such as spin-torque magnetoresistive random access memory ("MRAM") or resistive access memory ("RRAM"). Such memory technology is known in the art and requires no further description; see, for example, regarding FRAM U.S. Patent Application Publication Number 2014/0075088, which is incorporated herein by reference in its entirety. Typically, the non-volatile memory 115 will have a high write cycle endurance of $10^{10}$ or higher to be able to provide a sufficient shelf life for expected cycling of the device 100 during normal use.

Depending on the particular implementation, the NVL sub-system 150 may include any of a variety of aspects. Such systems typically include an NVL clock 152. Optionally, input and output multiplexers 154 and 156 control connection of individual volatile storage elements 125, 110 to an individual one or rows of one NVL array 115. In such an implementation, a dedicated bus 160 separate from a system bus 165 connects the non-volatile logic array(s) 115 to the configuration registers 125 and memory 110. The dedicated bus 160 allows direct connection to the configuration registers 125 and memory 110 to operate under the control of the NVL subsystem 150. Similarly, another separate bus 167 can be implemented to directly connect the configuration registers 125 and memory 110 to the input multiplexer 154 for connection to the NVL array(s) 115. Therefore, the transfer of data from the volatile storage to the NVL storage can be done under the NVL subsystem's hardware control.

Figure 2:
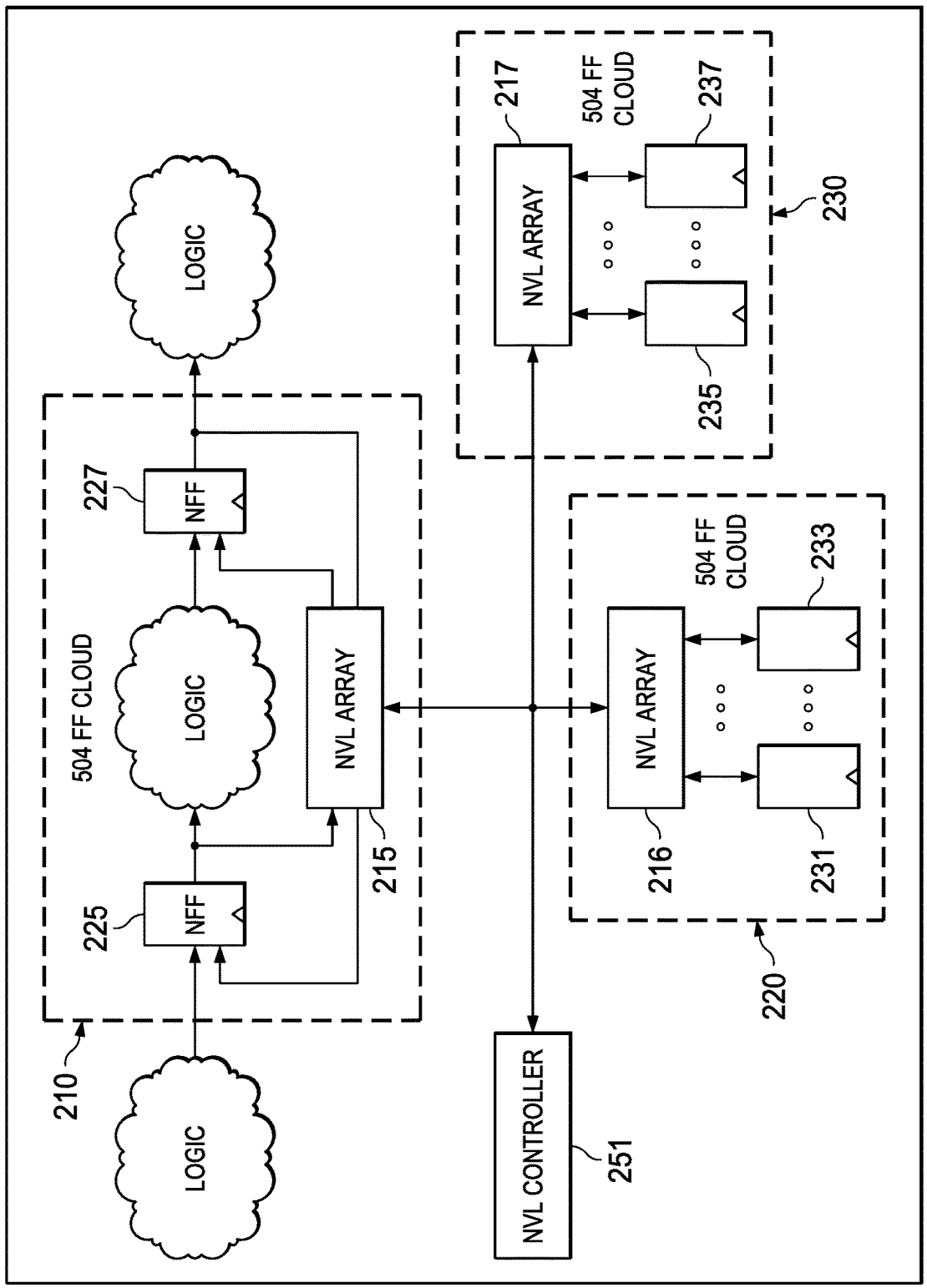
FIG. 2 is a block diagram of an example computing device with NVL memory disposed adjacent to volatile storage elements as configured in accordance with various embodiments of the invention.

In another approach illustrated in FIG. 2, separate NVL arrays 215, 216, 217 are disposed physically closely to corresponding volatile storage elements such as groups of flip flops. In the illustrated example, flip flop volatile storage elements 225 and 227, 231 and 233, 235 and 237 are arranged in flip flop clouds 210, 220, 230 corresponding to particular peripherals or CPU subsystems. The NVL controller 251 controls the functioning of each of the arrays 215, 216, 217 to store data from and restore data to their respectively associated flip flops.

Turning again to FIG. 1, the power management unit 140 is configured to interrupt a normal processing order of the CPU 105 to effect entry of the CPU 105 into a low power mode. The entry into a low power mode can be triggered in response to detecting a power loss event initiated by the power management unit 140 due to detection of a power loss scenario or proactively initiated by the CPU 105 to save energy. Thus, the power management unit 140 is able to initiate the process in response to either a power loss event or simply an affirmative entry into a low power mode for power savings.

The energy storage unit 130 is configured to hold enough energy to operate the computing device apparatus 100 after removal of normal operating power from the computing device apparatus 100. The power management unit 140 in turn uses the energy stored in the energy storage device 130 to trigger the non-volatile memory controller 151 to store data stored in the volatile storage elements 110, 125 in the non-volatile memory 115 in response to entering into the low power mode. After the data is saved in the non-volatile memory 115, the power management unit 140 effects switching off power to at least the CPU 105 as part of entering the low power mode. Optionally, the power management unit 140 is configured to prevent a startup of the computing device apparatus 100 unless enough energy is present on the energy storage unit 130 to complete a round trip restore and save operation to ensure stability of the device. One advantage of such an approach can be understood with reference to the example implementation illustrated in FIG. 3.

Figure 3:
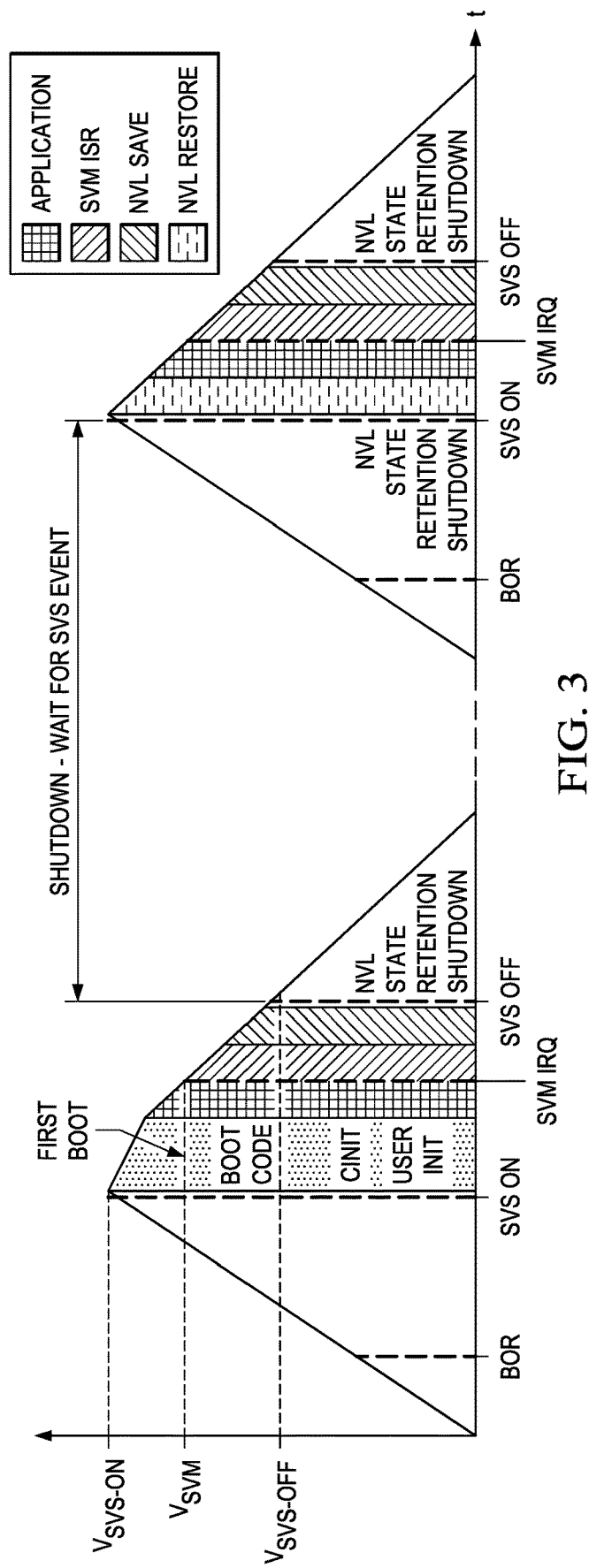
FIG. 3 is a graph illustrating different operating states of a computing device according to available power as configured in accordance with various embodiments of the invention.

FIG. 3 illustrates an amount of power available to a device over the course of various operation conditions. The device of this example operates with a supply voltage supervisor (SVS), which indicates when the available power is within a particular range. The available power is illustrated with markers $V_{SVS-ON}$, $V_{SVM}$, and $V_{SVS-OFF}$ illustrating cut-off values of the power with respect to operation of the device. Here, $V_{SVS-ON}$ represents a typical normal power level for a device operating normally, for example, 2.5 volts. $V_{SVM}$ represents a minimum power level, for example, 2.2 volts, available such that if outside power is cut, the energy storage unit 130 is holding sufficient power to complete a data storage operation to the NVL memory 115. $V_{SVS-OFF}$ represents the cut-off in minimum power to allow for operations during entry into a low power mode, for example, 1.8 volts. In operation, the power management unit 140 will monitor the available power using known methods such as an analog comparator on the external power supply. Should the available power drop below the $V_{SVM}$ level, the power management unit 140 interrupts operation of the CPU 105 (interrupt service routine, ISR) to begin entry into the low power mode, including saving data from the volatile storage elements 110 and 125 to the NVL memory 115. In a typical implementation, the interrupt and data save operations take only about 100 microseconds, so the amount of energy stored in the energy storage unit 130 need not be large. That said, the size of the energy storage unit 130 can be tailored to a particular device design, whereby a larger energy storage can be used where a more power intensive process for entry into the low power mode is expected.

Referring again to FIG. 1, the low power mode is exited in response to detecting either restoration of power in the event of power loss or a wakeup request when the low power mode was entered as part of a power savings strategy. In response to detecting the restoration of power to the computing device apparatus 100 or the wakeup request from the CPU's 105 power off state, the power management unit 140 triggers the non-volatile memory controller 151 to restore the data to the volatile storage elements 110, 125 from the non-volatile memory 115 prior to execution of a wake up process for the CPU 105 from the low power mode.

Such a wake up process is illustrated in FIG. 3, where after completing an NVL save operation when the available power dropped below the $V_{SVS\text{-}OFF}$ level, the power returns to the $V_{SVS\text{-}ON}$ level. In this example, this level is the minimum power needed to complete a round trip restore and store operation. As illustrated in FIG. 3, when available power reaches the $V_{SVS\text{-}ON}$ level, the power management unit 140 triggers restoration of the data from NVL memory 115 to the respective volatile storage elements, and the user application is continuous from the state before the ISR was executed. Assuming power is cut when the restoration process begins, the available power after the restoration and application execution process is about the $V_{SVM}$ level, which triggers another NVL store operation during re-entry into the low power mode. So configured, overall stability of the device is improved because device state data needed for restart is sure to be resaved and not lost due to immediate loss of power upon restarting of the device.

As part of the wakeup process, the CPU 105 and the power management unit are configured to not automatically trigger execution of a cold boot initialization process in response to the detecting the restoration of power or the wake up request. By using the hardware configuration for automatically restoring the data from the NVL memory 115, the computing device can be placed into a state ready for execution of a loaded application faster and more efficiently than by executing the cold boot processing, including, for example, the C-Init and user-Init processes.

Figure 4:
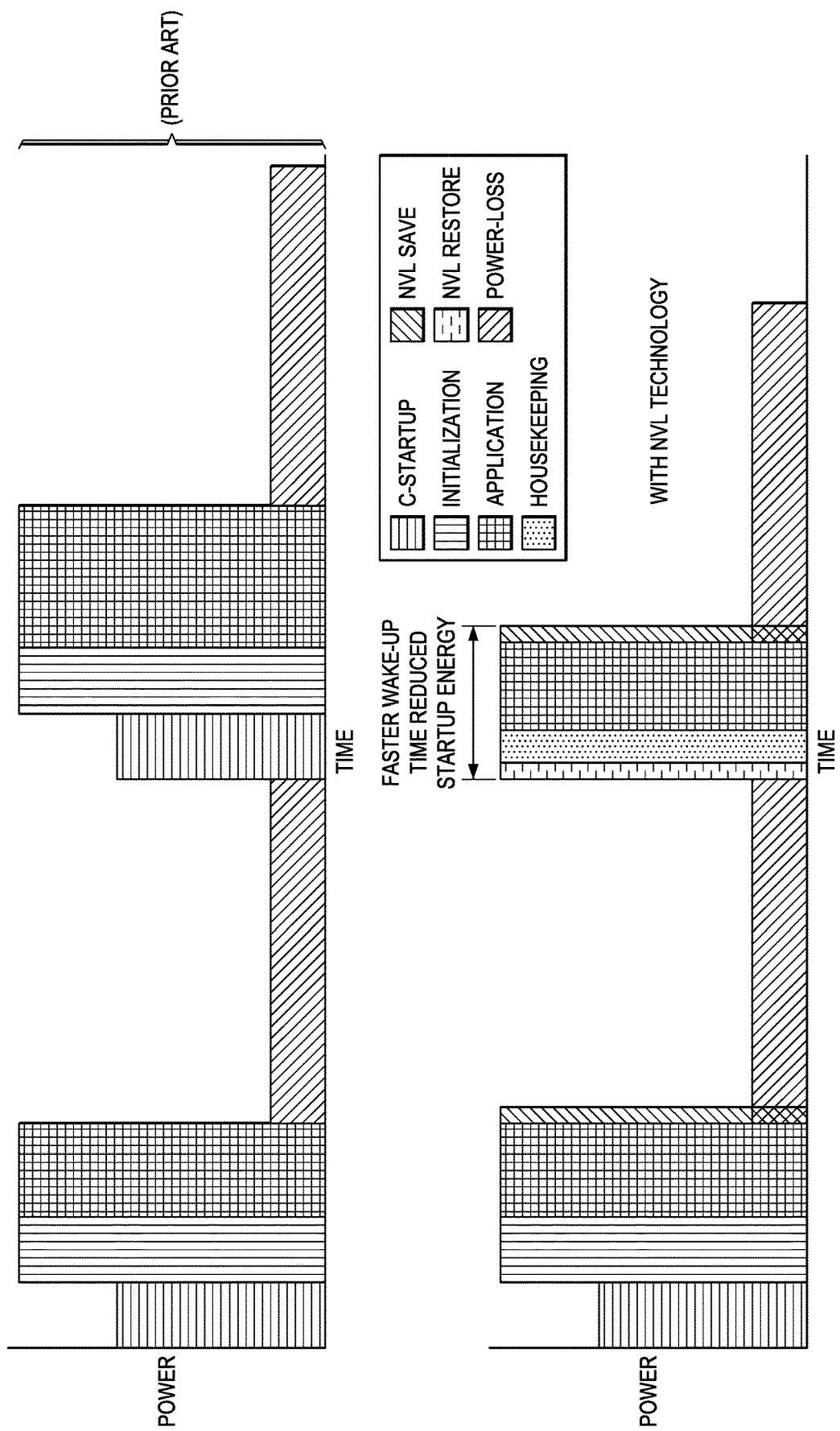
FIG. 4 is a graph comparing a prior art approach to start up, low power event, and wake up cycle to a start up, low power event, and wake up cycle of a computing device as configured in accordance with various embodiments of the invention.

Efficiencies gained through application of these concepts are illustrated in the examples of FIG. 4. After an initial boot sequence (C-startup) and initialization sequence for the device and its application(s), the device's application(s) run normally. In the event of a power loss, the energy storage unit provides sufficient power to execute the described NVL save as part of the entry into the corresponding low power mode. When power is again available, instead of re-running the boot sequence and initialization sequence as illustrated in the prior art process, the NVL restore process followed by a "housekeeping" process is performed, which processes are completed in a much shorter amount of time as compared to the prior art power up process. In the example illustrated in FIG. 4, the device's application is able to start when using the NVL approach at a point in time where a prior art device is still completing its boot sequence, resulting in significant time and power savings. A further advantage is illustrated in that because of the relatively short wake up process, the device using the NVL approach is ready for another power loss event sooner than the prior art device. Thus, the described approach reduces the chances that power is lost during a critical portion of the boot sequence, which in turn provides improved overall stability of the device's operation.

With reference again to FIG. 1, the data stored in the NVL memory 115 during the entry into the low power mode represents a state of one or more of the CPU 105 or one or more peripherals 120. For example, the NVL memory controller 151 is configured to effect storing in the NVL memory 115 the state of the CPU 105 by storing one or more of program counters, stack pointers, status registers, general purpose registers, or other key state information of the CPU 105. Similarly, the NVL memory controller 151 is configured to effect storing in the NVL memory 115 the state of the one or more peripherals 120 associated with the CPU 105 by storing one or more of peripheral configuration registers, peripheral state registers, peripheral status registers, peripheral data buffers, and other key peripheral state information that may be stored in active settings configuration registers 125 associated with the peripherals 120. The state's static image could be restored upon each system reset or power up reset so that a stable and repeatable machine state can be recovered.

Certain data stored in the volatile storage 110 and 125 may not be stored in various approaches where such data is known to be unreliable or unhelpful during the restart operation. For example, the non-volatile memory controller may be configured to not store any one or combination of bus interface state information, serial communication module information, state machine information, or pipeline register information for the CPU 105 in response to entering the low power mode. Such information is not needed if the transition to the deep low power mode comes from a first low power mode where various ones of these aspects are already in an idle mode. Such parameters can be reset during the above mentioned "housekeeping" process, which is analogous to a typical wake up from an intermediate low power mode to reset these limited parameters. Because there is a relatively small number of such parameters subject to reset during the limited reboot, the wake up process remains much shorter in duration as illustrated in FIG. 4.

Figure 5:
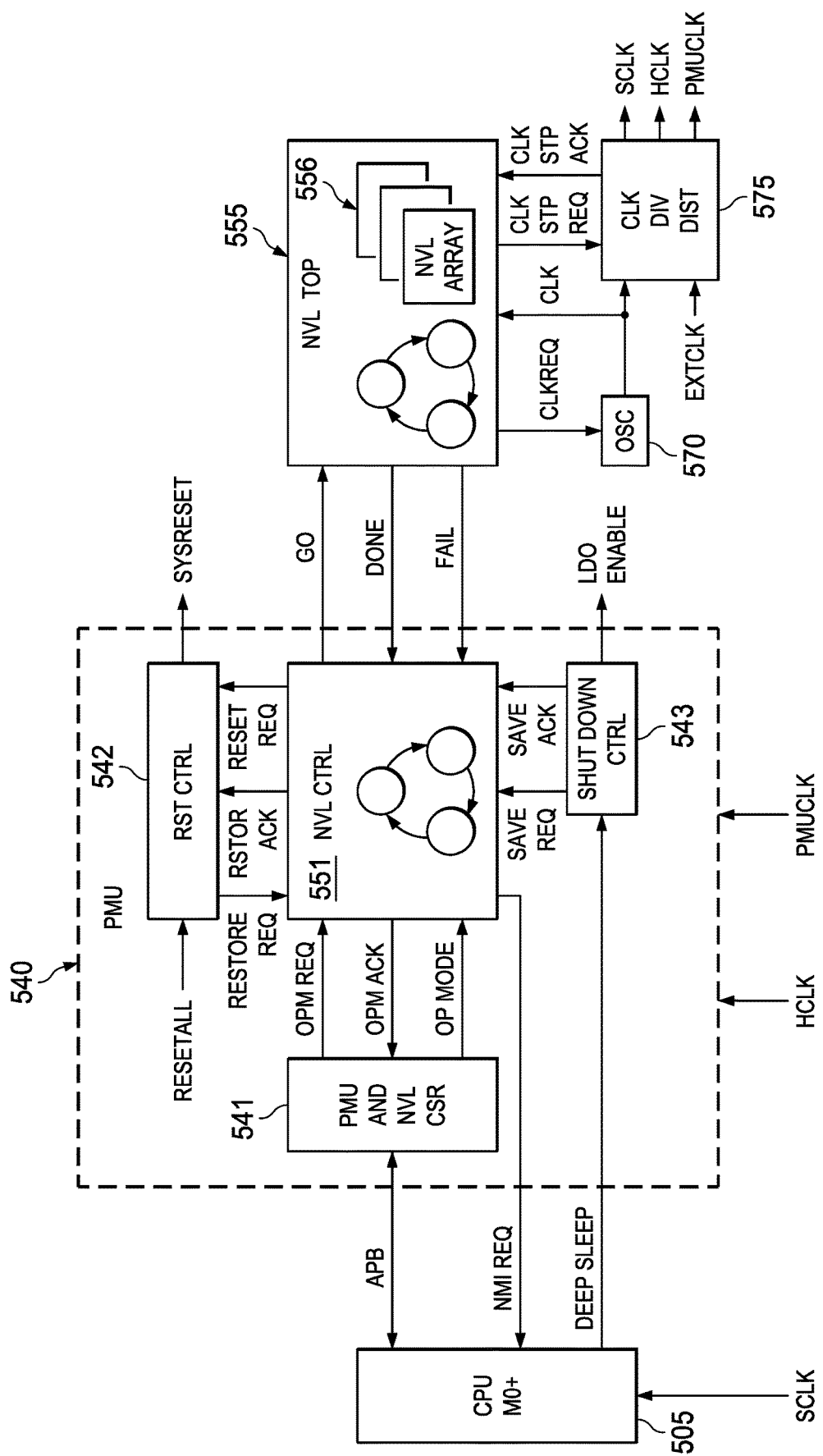
FIG. 5 is a block diagram of another example computing device as configured in accordance with various embodiments of the invention.

Turning to FIG. 5, one example implementation of the type of system and interactions used for the described processes will be discussed. Here, the CPU 505 interacts with a power management unit 540 in the form of a state machine wrapper controlled at least in part by the NVL controller 551, illustrated here as a hardware implemented state machine. An advanced peripheral bus (APB) connects the CPU 505 and the power management unit and NVL control and status register (CSR) 541. The CPU 505 is further configured to receive a non-maskable interrupt (NMI) request signal from the NVL controller 551 to interrupt the CPU's normal process during entry into a low power mode, such as in response to detection of a power loss event. A reset control module 542 interacts with the NVL controller 551 to provide a system reset signal. A shut down control module 543 receives a trigger signal from the CPU 505 and interacts with the NVL controller 551 to trigger a transition to a low power mode in response to receipt of the CPU's trigger signal. The NVL controller 551 controls the NVL subsystem 555, which includes the NVL arrays 556, to control the automatic saving of information from the volatile storage elements to the NVL arrays 556 during transition to a low power mode and restoring that information back to the volatile storage elements on wake up. An oscillator 570 and clock divider 575 provide the various clock signals for the system. So configured, the hardware based state machine controls the storage and restoring of state machine information to provide improved wake up times from a low power mode.

Figure 6:
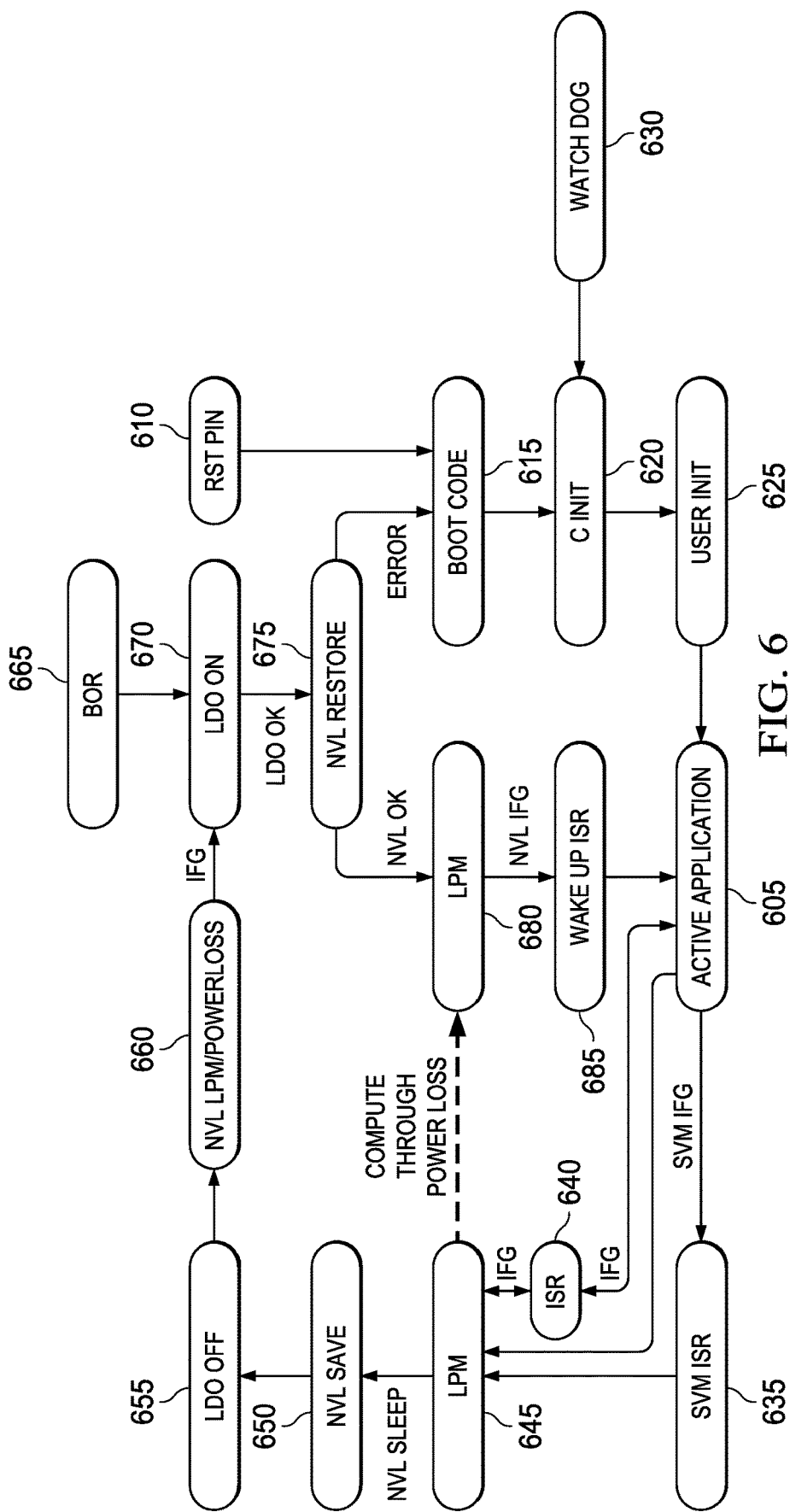
FIG. 6 is a flow diagram of an example method of operation of a computing device as configured in accordance with various embodiments of the invention.

FIG. 6 illustrates one example method of operation for a device in accord with these teachings. A computing device with a CPU and peripheral devices operates in a normal mode of operation at the Active Application step 605. If the device is newly started, it will reach this Active Application step 605 after the reset condition 610 triggers the boot code 615 to complete a cold boot, C-Init 620 to initialize the device, and a User-Init process 625 to initialize the device's application. In another approach, a watch dog process 630 may trigger the C-Init 620 and following processes.

A device with a normally operating active application 605 uses hardware of the computing device including a power management unit to detect a low power event for the processing device. As illustrated in FIG. 6, the low power event can be initiated by the power management unit due to detection of a power loss scenario via step 635 or initiated by the central processing unit via an active interrupt 640 to save energy. In either case, in response to detecting the low power event, the device uses energy stored in an energy storage device for the computing device to control entry into a first low power mode 645. In this example, after entry into the low power mode 645, the device may transition to a deep low power mode. This transition includes triggering a non-volatile memory controller to store data stored in the volatile storage elements in a non-volatile memory having direct physical access to the volatile storage elements at the NVL save step 650. After the data is saved, power is switched off to at least the CPU at step 655, completing the device's transition to a deep low power mode, i.e., an NVL low power mode or power loss state 660.

During the deep low power mode state 660, the power management unit detects either restoration of power past a brownout level at step 665 to the computing device apparatus or a wakeup request from the central computing unit's power off state. In response to detecting the restoration of power or the wake up request, a low dropout voltage regulator is triggered on 670, and the non-volatile memory controller is triggered to restore 675 the data to the volatile storage elements from the non-volatile memory. With the state data restored, the device is back to a low power mode 680 from which a subsequent wake up process 685 for the central processing unit can be efficiently executed. The wake up process 685 includes a minimal clean-up operation compared to a typical prior cold boot wake up process, wherein the minimal clean-up operation is typically targeted to unstable variables whose storage in a NVL memory would not contribute to stable operation of the device.

So configured, this implementation of non-volatile logic allows the construction of a computing system that may only go through the initialization cycle once in its lifetime, even if the power supply is interrupted. The device state (CPU and peripherals) can be saved while the device is in a low power mode prior to entering a deep low power mode. From a software point of view operating on the device, the next power cycle will look like a simple wakeup from low power mode and not like a device startup, thereby conserving power and time. Additional advantages for executing this process during a low power mode include that because the system is inactive and all clocks are stopped (fixed state), the process may use a known and proven method to go into and come out of low power mode. Also, existing software supports low power mode operation today such that no new concept need be learned to implement. Moreover, the defined state allows for not saving all data from all data storage elements, for instance all flip-flops (area, power, wake up time saving). For example, the bus interface is idle such that there is no need to save idle state, serial communication is stopped such that there is no need to save serializer data, the state machine is idle such that there is no need to save idle state, pipeline registers in the CPU and peripherals are flushed because no save is needed in view of the separate non-volatile storage for storing that information, and a controlled stop/start via low power mode allows for software interaction for clean entry and exit of the deep low power mode NVL save and restore process.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. A method for operating an electronic device having volatile storage elements, non-volatile storage elements, the method comprising:
   causing the electronic device to enter a low power mode in response to a power level of the electronic device dropping below a first threshold level, wherein entering the low power mode includes performing a save operation in which data stored in the volatile storage elements is transferred to the non-volatile storage elements; and
   causing the electronic device to exit the low power mode in response to the power level of the electronic device reaching a second threshold level that is greater than the first threshold level, wherein exiting the low power mode includes performing a restore operation in which the data stored in the non-volatile storage elements is transferred to the volatile storage elements, and wherein the second threshold level represents an amount of power sufficient to complete the restore operation and the save operation.

2. The method of claim 1, wherein entering the low power mode includes stopping supply of power to the electronic device after the save operation is completed.

3. The method of claim 2, wherein entering the low power mode includes stopping operation of the electronic device by performing an interrupt service routine before performing the save operation.

4. The method of claim 1, wherein the electronic device includes a primary power source and a secondary power source, wherein the power level of the electronic device dropping below the first threshold level is at least partially in response to removal of power supplied by the primary power source.

5. The method of claim 1, wherein performing the save operation when entering the low power mode comprises using power supplied by a secondary power source.

6. The method of claim 5, wherein the secondary power source includes a capacitor.

7. The method of claim 1, comprising, after the electronic device has entered the low power mode, preventing the electronic device from exiting the low power mode in response to the power level of the electronic device not being at least the second threshold level.

8. The method of claim 1, wherein:
the first threshold level is approximately 2.2 volts; and
the second threshold level is approximately 2.5 volts.

9. The method of claim 1, wherein the data transferred from the volatile storage elements to the non-volatile storage elements when performing the save operation does not include bus interface state information for a processor of the electronic device.

10. The method of claim 1, wherein the data transferred from the volatile storage elements to the non-volatile storage elements when performing the save operation does not include serial communication module information for a processor of the electronic device.

11. The method of claim 1, wherein the data transferred from the volatile storage elements to the non-volatile storage elements when performing the save operation does not include pipeline register information for a processor of the electronic device.

12. The method of claim 1, wherein the data transferred from the volatile storage elements to the non-volatile storage elements when performing the save operation does not include state machine information for a processor of the electronic device.

13. The method of claim 1, wherein the data transferred from the volatile storage elements to the non-volatile storage elements when performing the save operation includes one or more of a program counter, a stack pointer, a status register, a general purpose register, or other state information of a processor of the electronic device.

14. The method of claim 1, wherein the data transferred from the volatile storage elements to the non-volatile storage elements when performing the save operation includes one or more of a configuration register, a state register, a status register, a data buffer, and other state information of a peripheral device of the electronic device.

15. The method of claim 1, wherein the non-volatile storage elements are storage elements of a flash memory, an FRAM memory, an MRAM memory, or an RRAM memory, or a combination thereof.

* * * * *